(12) United States Patent
Szymkowiak et al.

(10) Patent No.: US 10,323,695 B2
(45) Date of Patent: Jun. 18, 2019

(54) CLUTCH ASSEMBLY WITH FLUID EVACUATION

(71) Applicant: American Axle & Manufacturing, Inc., Detroit, MI (US)

(72) Inventors: Michal Szymkowiak, Bad Homburg (DE); Paul J. Valente, Berkley, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 554 days.

(21) Appl. No.: 15/014,168

(22) Filed: Feb. 3, 2016

(65) Prior Publication Data

US 2016/0230817 A1   Aug. 11, 2016

Related U.S. Application Data

(60) Provisional application No. 62/114,657, filed on Feb. 11, 2015.

(51) Int. Cl.
| | | |
|---|---|---|
| *F16D 13/74* | (2006.01) | |
| *F16D 25/0638* | (2006.01) | |
| *F16D 25/12* | (2006.01) | |
| *F16H 57/04* | (2010.01) | |
| *F16D 13/52* | (2006.01) | |

(52) U.S. Cl.
CPC ......... *F16D 13/74* (2013.01); *F16D 25/0638* (2013.01); *F16D 25/123* (2013.01); *F16H 57/045* (2013.01); *F16H 57/0447* (2013.01); *F16H 57/0453* (2013.01); *F16H 57/0457* (2013.01); *F16H 57/0473* (2013.01); *F16H 57/0483* (2013.01); *F16D 13/52* (2013.01); *F16D 2300/0214* (2013.01)

(58) Field of Classification Search
CPC ...... F16D 13/52; F16D 13/74; F16D 25/0638; F16D 25/123
See application file for complete search history.

(56) References Cited

U.S. PATENT DOCUMENTS

| | | | |
|---|---|---|---|
| 3,662,857 A | 5/1972 | de Brie Perry | |
| 7,294,086 B2 * | 11/2007 | Brissenden | F16D 25/14 475/231 |
| 8,845,473 B2 | 9/2014 | Nett et al. | |
| 2014/0172250 A1 | 6/2014 | Tamai et al. | |
| 2015/0057125 A1 | 2/2015 | Pump et al. | |

FOREIGN PATENT DOCUMENTS

| | | |
|---|---|---|
| CN | 103807417 A | 5/2014 |
| WO | WO-2013/045444 A1 | 4/2013 |
| WO | WO-2013/045445 A1 | 4/2013 |

* cited by examiner

*Primary Examiner* — Erin D Bishop
(74) *Attorney, Agent, or Firm* — Harness, Dickey & Pierce, P.L.C.

(57) ABSTRACT

A clutched device has a housing, which defines a clutch sump, a friction clutch that is received in the housing, a first reservoir, an evacuation device and a pump that is configured to transmit fluid between the first reservoir and the friction clutch for operating the friction clutch. The evacuation device is selectively operable for changing the effective volume of the clutch sump so that the level of lubrication in the clutch sump can be lowered to reduce drag forces caused by the presence of lubricant between clutch plates of the friction clutch when the friction clutch is not in use.

9 Claims, 5 Drawing Sheets

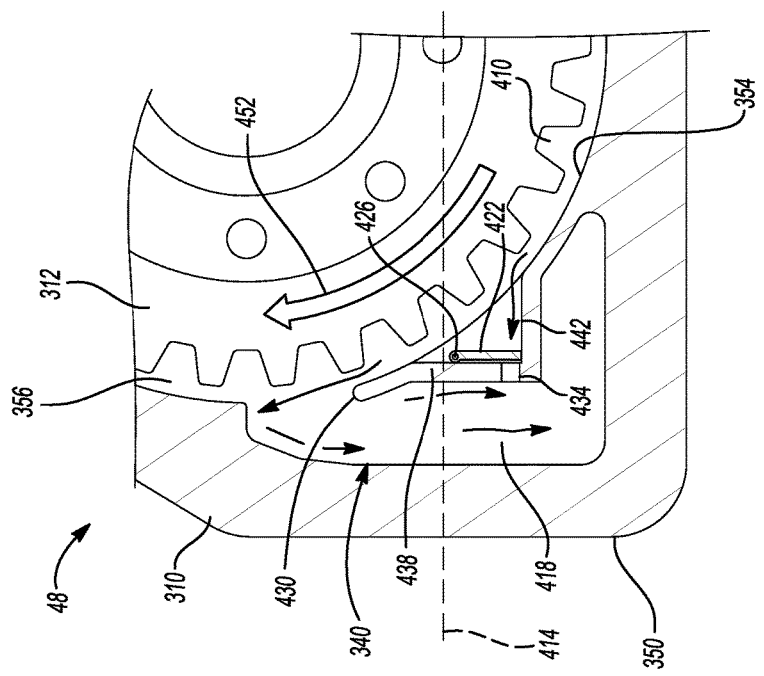
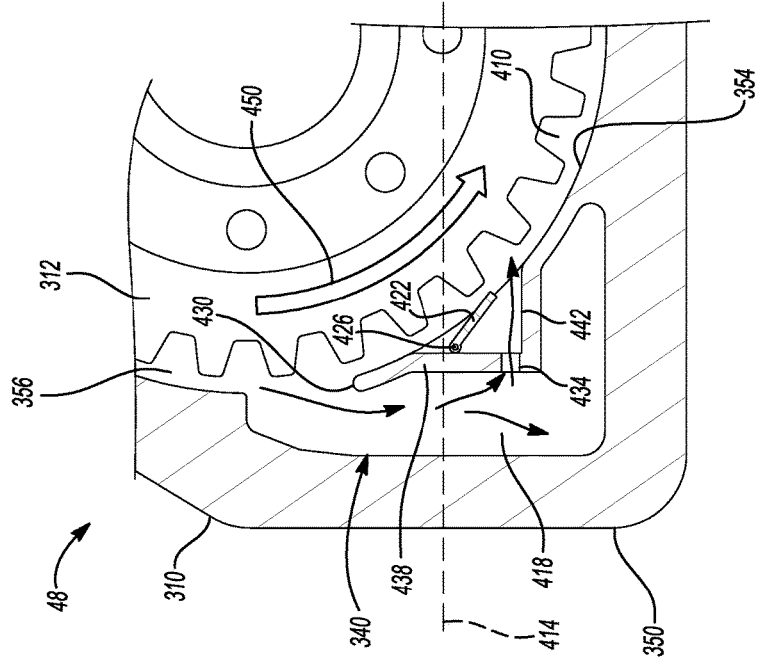

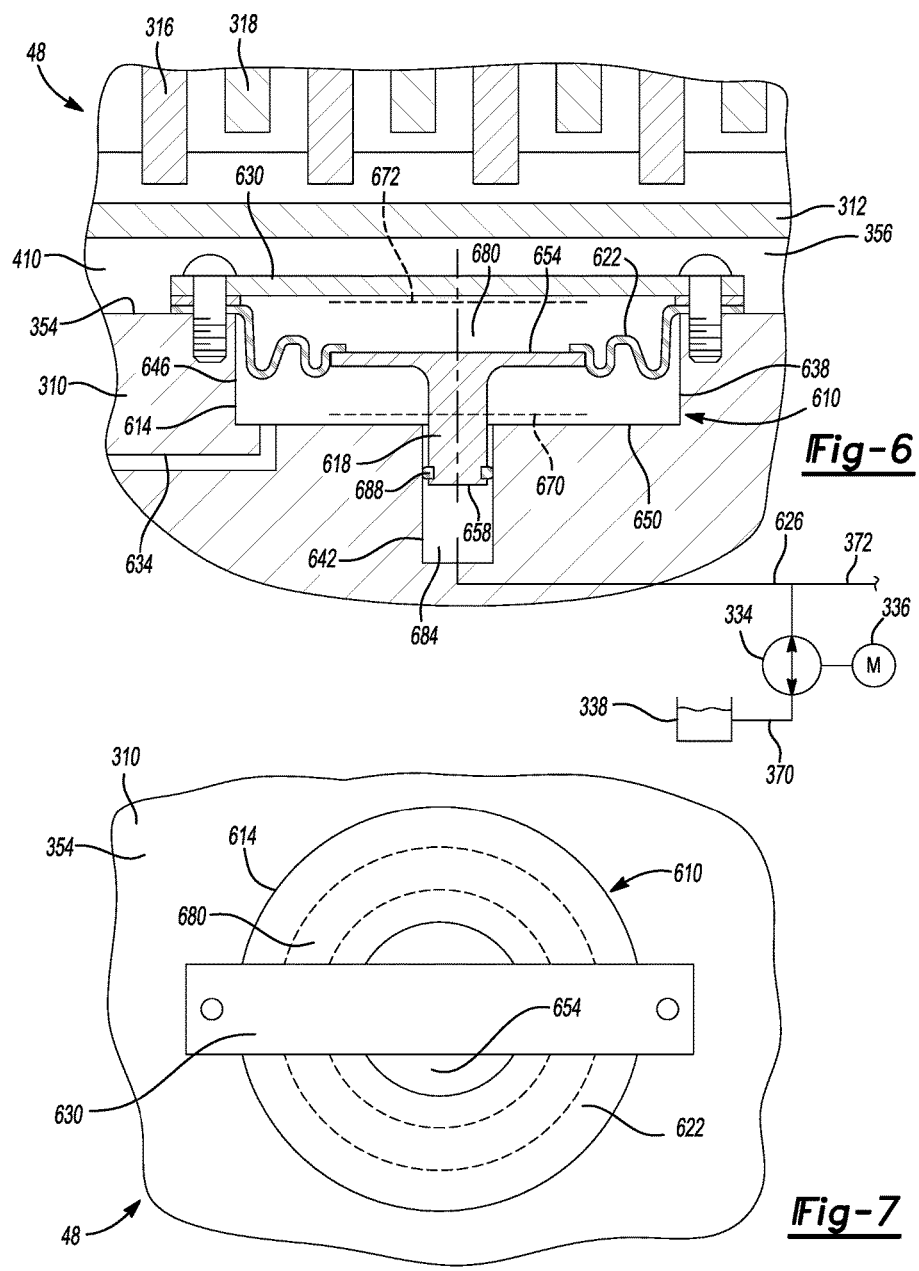

CLUTCH ASSEMBLY WITH FLUID EVACUATION

CROSS-REFERENCE TO RELATED APPLICATIONS

This application claims the benefit of U.S. Provisional Patent Application No. 62/114,657 filed Feb. 11, 2015, the disclosure of which is incorporated by reference as if fully set forth in detail herein.

FIELD

The present disclosure relates to a clutched device having a clutch assembly with a fluid evacuation system.

BACKGROUND

This section provides background information related to the present disclosure which is not necessarily prior art.

Power transmitting components with a torque transfer device, such as a disconnecting drive module in an all-wheel drive ("AWD") system, generally include a clutch with a plurality of friction plates and a piston for selectively engaging the friction plates. The friction plates are generally bathed in a fluid to provide lubrication and cooling of the plates when the clutch is engaged. When the clutch is disengaged, the plates are generally separated. When separated, excess fluid between the plates and within a clutch sump through which the plates rotate, can increase the system drag torque. It is advantageous to decrease the amount of system drag torque. Minimizing the level of fluid within the clutch sump can reduce the amount of drag torque from the clutch. However, sufficient fluid must be available during engagement of the clutch to prevent excessive temperatures and plate damage. As a result, it can be difficult to maintain the optimal amount of fluid within the clutch during both engagement and disengagement.

SUMMARY

This section provides a general summary of the disclosure, and is not a comprehensive disclosure of its full scope or all of its features.

The present teachings provide for a clutched device including an input member, a first output member, a second output member, a third output member, a differential, a lubricant fluid, a housing, a clutch assembly, and a gate. The input member can be configured to receive rotational power and rotate about a first axis. The first output member, second output member, and third output member can be configured to rotate about a second axis that is transverse to the first axis. The differential can include a differential case and a differential gearset. The differential case can be drivingly coupled to the input member. The differential gearset can be configured to transmit rotary power between the differential case and the first and second output members. The housing can have an inner wall disposed about the second axis. The housing can define a clutch sump and a reservoir. The reservoir can be spaced apart from the clutch sump by the inner wall. The inner wall can define a first aperture and a second aperture. The first aperture can be open to the clutch sump and the reservoir. The second aperture can be spaced apart from the first aperture and can fluidly couple the clutch sump and the reservoir. The clutch assembly can include an inner carrier, an outer carrier, a plurality of first clutch plates, and a plurality of second clutch plates. The outer carrier can be configured to rotate through the clutch sump and sling an amount of the lubricant fluid from the clutch sump through the first aperture. The outer carrier can be coupled for rotation with the second output member and the inner carrier can be coupled for rotation with the third output member. The first and second clutch plates can be interleaved. The gate can be coupled to the housing and can be movable between a first position and a second position. When the gate is in the first position, the gate can block the second aperture to inhibit fluid communication between the reservoir and the clutch sump through the second aperture. When the gate is in the second position, the gate cannot block the second aperture so as to permit fluid communication between the reservoir and the clutch sump through the second aperture. The lubricant fluid can define a static fluid level in the clutch sump, which can be a maximum level of the lubricant fluid in the clutch sump when the inner and outer carriers are not rotating. The first aperture can be disposed above the static fluid level and the second aperture can be disposed below the static fluid level.

The present teachings further provide for a clutched device including an input member, a first output member, a second output member, a third output member, a differential, a lubricant fluid, a housing, a clutch assembly, and a valve. The input member can be configured to receive rotational power and rotate about a first axis. The first output member, second output member, and third output members can be configured to rotate about a second axis that is transverse to the first axis. The differential can include a differential case and a differential gearset. The differential case can be drivingly coupled to the input member. The differential gearset can be configured to transmit rotary power between the differential case and the first and second output members. The housing can have an inner wall disposed about the second axis. The housing can define a clutch sump and a reservoir. The reservoir can be spaced apart from the clutch sump by the inner wall. The inner wall can define a first aperture that can be open to the clutch sump and the reservoir. The clutch assembly can include an inner carrier, an outer carrier, a plurality of first clutch plates, and a plurality of second clutch plates. The outer carrier can be configured to rotate through the clutch sump and sling an amount of the lubricant fluid from the clutch sump through the first aperture. The outer carrier can be coupled for rotation with the second output member and the inner carrier can be coupled for rotation with the third output member. The first and second clutch plates can be interleaved. The valve can include a second aperture and a valve member. The second aperture can fluidly couple the clutch sump and the reservoir. The valve member can be movable relative to the second aperture between a first position and a second position. When the valve member is in the first position, the valve member can be configured to inhibit fluid communication from the clutch sump to the reservoir through the second aperture, and when the valve member is in the second position, the valve member can be configured to permit fluid communication from the reservoir to the clutch sump through the second aperture. The lubricant fluid can define a static fluid level that can be a maximum level of the lubricant fluid in the clutch sump when the inner and outer carriers are not rotating. The first aperture can be disposed above the static fluid level and the second aperture can be disposed below the static fluid level.

The present teachings further provide for a clutched device including an input member, an output member, a housing, a clutch assembly, a first reservoir, an evacuation device, and a pump. The housing can define a clutch sump.

The clutch assembly can include a first piston chamber, a first piston, and a plurality of interleaved clutch plates. The first piston can be configured to move between a first position and a second position. The clutch plates can be configured to rotate through the clutch sump and to transmit torque between the input member and the output member when the first piston is in the second position. The first reservoir can be configured to hold a hydraulic fluid. The evacuation device can include a second piston chamber. The second piston can be disposed within the second piston chamber and can be configured to move between a third position and a fourth position. The second piston can have a first side and a second side. The first side of the second piston and the second piston chamber can define a second reservoir that can be in fluid communication with the clutch sump. The second reservoir can have a first volume when the second piston is in the third position and a second volume that is greater than the first volume when the second piston is in the fourth position. The second side of the second piston and the second piston chamber can define an actuator chamber that can be coupled for fluid communication with the first piston chamber. The pump can be operable in a first mode wherein the pump can be configured to pump the hydraulic fluid from the first reservoir to the first piston chamber and the actuator chamber, and a second mode wherein the pump can be configured to pump the hydraulic fluid from the first piston chamber and the actuator chamber to the first reservoir.

The present teachings further provide for a clutched device including an input member, an output member, a housing, a lubricant fluid, a clutch assembly, and a means for controlling a volume of the lubricant fluid in a clutch sump defined by the housing. The clutch assembly can include a first piston chamber, a first piston, and a plurality of interleaved clutch plates. The first piston can be configured to move between a first piston position and a second piston position. The clutch plates can be configured to rotate through the clutch sump and to transmit torque between the input member and the output member when the first piston is in the second piston position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a sectional view of a portion of the clutch assembly of FIG. 2, illustrating a fluid evacuation system of a first construction having a gate in a first position;

FIG. 4 is a sectional view similar to FIG. 3, illustrating the gate in a second position;

FIG. 6 is a sectional view of a portion of the clutch assembly of FIG. 2, illustrating a fluid evacuation system of a third construction; and FIG. 7 is an elevated view of the fluid evacuation system of FIG. 6.

Corresponding reference numerals indicate corresponding parts throughout the several views of the drawings.

DETAILED DESCRIPTION

Example embodiments will now be described more fully with reference to the accompanying drawings.

Figure 1:
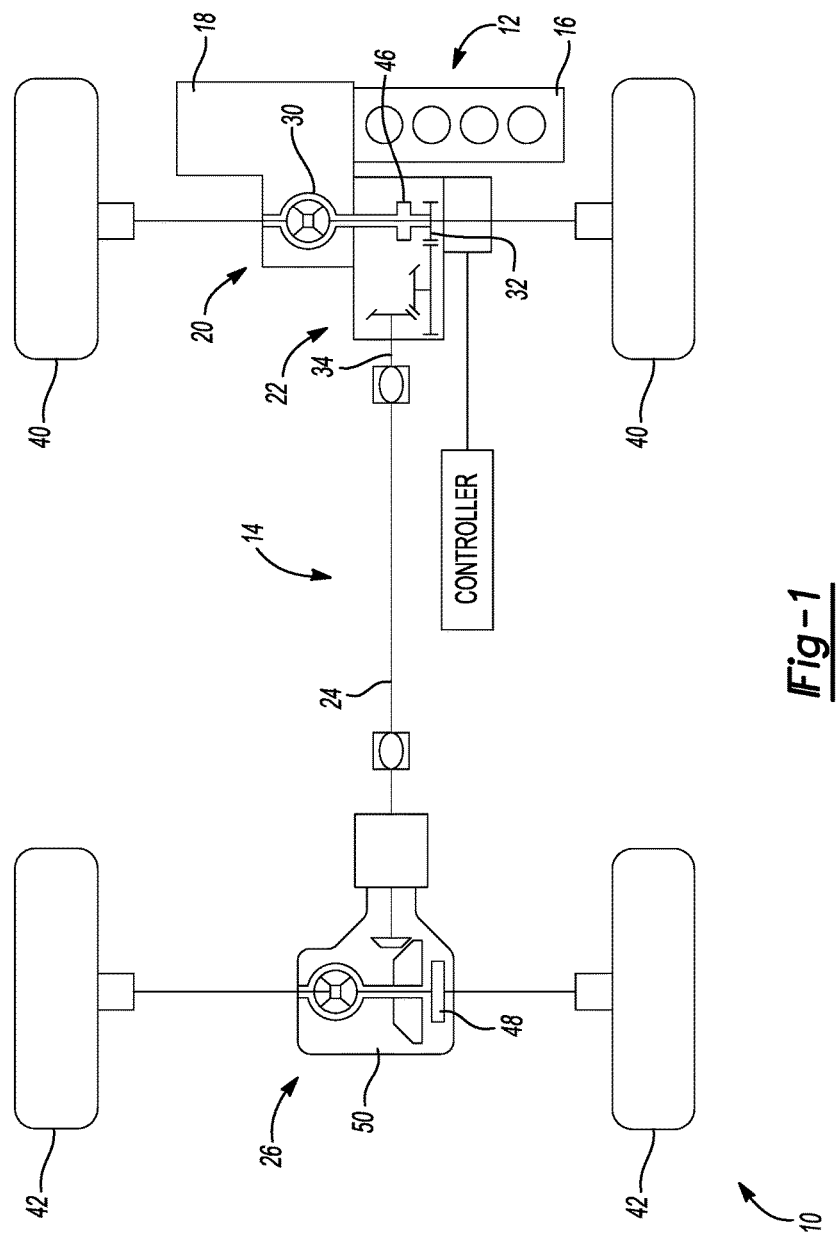
FIG. 1 is a schematic view of a vehicle having a clutched device constructed in accordance with the present teachings.

With reference to FIG. 1 of the drawings, an example of a vehicle having a clutched device constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD"), rear-wheel drive configurations ("RWD"), and front-wheel drive ("FWD") configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. The drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a clutched device) that is constructed in accordance with the teachings of the present disclosure. It will be appreciated, however, that the teachings of the present disclosure have application to various other clutched devices, such as transmissions, power take-offs, torque transfer devices, transfer cases, front axle assemblies, and any other power transmitting components that have a clutch and a housing forming a clutch sump.

Figure 2:
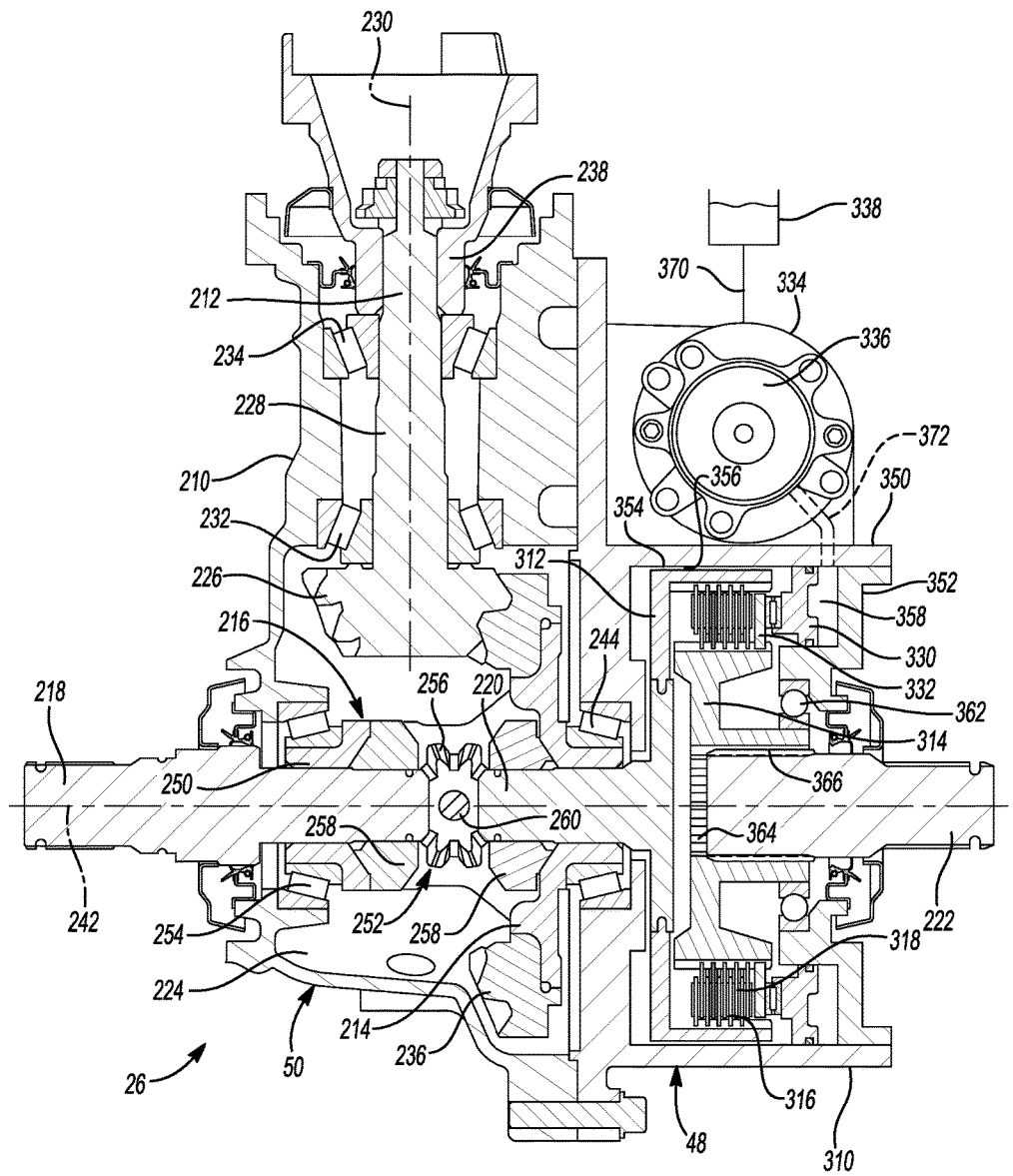
FIG. 2 is a sectional view of the clutched device of FIG. 1, illustrating a clutch cavity and a clutch assembly including a clutch plate carrier.

With reference to FIG. 2, the rear drive module 50 is illustrated in more detail. In the example provided, the rear drive module 50 is a type known as a split-shaft drive module. The rear drive module 50 can include a housing 210, an input pinion 212, an input member 214, the second clutch 48, a differential assembly 216, a first output shaft 218, a second output shaft 220, and a third output shaft 222. The housing 210 can define a first cavity 224 and the input pinion 212 can be a hypoid pinion having a hypoid gear 226, an input pinion shaft 228, and an input pinion flange 238. The input pinion flange 238 can be drivingly coupled to the prop shaft 24 (FIG. 1). The hypoid gear 226 can be disposed within the first cavity 224. The input pinion shaft 228 can be supported for rotation in the housing 210 along a first axis 230 by a head bearing 232 proximate to the hypoid gear 226 and a tail bearing 234 distal to the hypoid gear 226 and proximate to the input pinion flange 238 and prop shaft 24. The input member 214 can be a ring gear having a gear face 236. The input member 214 can be supported for rotation in the housing 210 about a second axis 242 by a bearing 244. The second axis 242 can be generally transverse or perpendicular to the first axis 230. The gear face 236 can be meshingly engaged with the hypoid gear 226.

The differential assembly 216 can include a differential case 250 and a differential gearset 252. The differential case 250 can be configured for rotation about the second axis 242. The differential case 250 can be drivingly coupled to the input member 214. The differential case 250 can be supported within the housing 210 by a bearing 254 and can be coupled to the input member 214 for common rotation about the second axis 242. The differential gearset 252 can be configured to transmit rotary power between the differential case 250 and the first and second output shafts 218, 220. In the example provided, the differential gearset 252 includes a pair of side gears 256 (only one of which is shown) and a pair of output gears 258 disposed within the differential case 250. The side gears 256 can be coupled for rotation with the differential case 250 about the second axis 242 and coupled for rotation relative to the differential case 250 about a cross pin 260. The cross pin 260 can be generally perpendicular to the second axis 242. The output gears 258 can be meshingly engaged with the side gears 256 and configured to rotate about the second axis 242. The first output shaft 218 can be drivingly coupled to one of the output gears 258 and can be coupled for common rotation therewith. The first output shaft 218 can be drivingly coupled to one of the rear wheels 42 (FIG. 1). The second output shaft 220 can be drivingly coupled to the other of the output gears 258 and can be coupled for common rotation therewith. The third output shaft 222 can be drivingly coupled to the other one of the rear wheels 42 (FIG. 1).

The second clutch 48 can be selectively operated to transmit rotary power from the second output shaft 220 to the third output shaft 222. In the particular example provided, the second clutch 48 is a friction clutch that is mounted co-axially with the input member 214 and the differential assembly 216 about the second axis 242. The second clutch 48 can include a clutch housing 310, an outer clutch plate carrier 312, an inner clutch plate carrier 314, a plurality of first clutch plates 316, a plurality of second clutch plates 318, a first piston 330, an apply plate 332, a pump 334, a pump motor 336, a first reservoir 338, and a fluid evacuation system 340 (FIGS. 3 and 4). The clutch housing 310 can be integrally formed with or partially formed by the housing 210 of the rear drive module 50 or can be separately formed and mounted to the housing 210. The clutch housing 310 can include a shell 350 and an end cap 352. The shell 350 can have an inner wall 354 that can be generally cylindrical in shape. The inner wall 354 and the end cap 352 can define a second cavity 356. The shell 350 and end cap 352 can also define a first piston chamber 358. The shell 350 can separate the first cavity 224 from the second cavity 356.

The outer and inner clutch plate carriers 312, 314 and the first and second clutch plates 316, 318 can be received in the second cavity 356. One of the outer and inner clutch plate carriers 312, 314 can be non-rotatably coupled to the third output shaft 222 and the plurality of first clutch plates 316. The other of the outer and inner clutch plate carriers 312, 314 can be non-rotatably coupled to the second output shaft 220 and the plurality of second clutch plates 318. In the particular example provided, the outer clutch plate carrier 312 is non-rotatably coupled to the second output shaft 220 and the plurality of first clutch plates 316, while the inner clutch plate carrier 314 is non-rotatably coupled to the third output shaft 222 and the plurality of second clutch plates 318. The inner clutch plate carrier 314 and the third output shaft 222 can be supported within the clutch housing 310 for rotation relative thereto by a bearing 362. In the example provided the bearing 362 is located radially between the inner clutch plate carrier 314 and the end cap 352, though other configurations can be used. In the example provided, the inner clutch plate carrier 314 includes a set of interior splines 364 that are meshingly engaged with a set of exterior splines 366 formed on the third output shaft 222 to non-rotatably couple the third output shaft 222 and the inner clutch plate carrier 314. The second clutch plates 318 can be interleaved with the first clutch plates 316 radially between the outer and inner clutch plate carriers 312, 314.

The first piston 330 can be received in the first piston chamber 358 and configured to translate along the second axis 242. The first piston 330 can be configured to move within the first piston chamber 358 between an extended position and a retracted position relative to the plurality of first and second clutch plates 316, 318. The pump 334 can be mounted to the housing 210 or the clutch housing 310 proximate to the pinion shaft 228 in a space generally nestled between the housing 210 and the clutch housing 310. The pump motor 336 can be a 2-way servo motor capable of running in forward and reverse and can be drivingly coupled to the pump 334 to selectively operate the pump 334.

The pump 334 can be fluidly coupled to the first reservoir 338 by a first pump conduit 370 and fluidly coupled to the first piston chamber 358 by a second pump conduit 372. In the example provided, the second pump conduit 372 is defined by the clutch housing 310. While schematically shown in FIG. 2 the first pump conduit 370 can also be defined by the clutch housing 310 and/or the housing 210. The first reservoir 338 can be configured to hold a hydraulic fluid. The pump 334 can be operated in a first mode to pump the hydraulic fluid in a first direction to supply the hydraulic fluid from the first reservoir 338 to the first piston chamber 358 to move the first piston 330 from the retracted position to the extended position. The pump 334 can be operated in a second mode to pump hydraulic fluid in a second direction to selectively remove hydraulic fluid from the first piston chamber 358 to the first reservoir 338 to move the first piston 330 from the extended position to the retracted position. The first reservoir 338 can be mounted to the housing 210 or the clutch housing 310. Alternatively, the first reservoir 338 can be integrally formed with the housing 210 or the clutch housing 310. The first reservoir 338 can also include a vent (not shown) that can vent gasses to the atmosphere or another part of the rear drive module 50.

The apply plate 332 can be disposed in the second cavity 356 between the first piston 330 and the plurality of first and second clutch plates 316, 318. The first piston 330 can be configured to translate the apply plate 332 along the second axis 242 to selectively engage the first and second clutch plates 316, 318 to compress the first and second clutch plates 316, 318 against one another so that the second clutch 48 can transmit rotary power between the second and third output shafts 220, 222. It will be appreciated that the second clutch 48 can be configured to not transmit rotary power between the second and third output shafts 220, 222 when the first piston 330 is in the retracted position. The second clutch 48 can also be configured to transmit various levels of torque by varying the position of the first piston 330 relative to the first and second clutch plates 316, 318.

With additional reference to FIGS. 3 and 4, a lower portion of the second cavity 356 can define a clutch sump 410 wherein a lubricant fluid can collect up to a static fluid level 414. The static fluid level 414 can be the maximum height of the lubricant fluid when the vehicle 10 is on a level surface, the outer and inner clutch plate carriers 312, 314 are not rotating, and all or substantially all of the lubricant fluid is disposed within the clutch sump 410. The fluid evacuation system 340 can include a second reservoir 418, a gate 422, and a hinge 426. The clutch housing 310 can define the second reservoir 418. The inner wall 354 can generally separate the second reservoir 418 from the second cavity 356 and the clutch sump 414. The inner wall 354 can define a first aperture 430, and a second aperture 434. A portion 438 of the inner wall 354 can extend radially outward from the surrounding inner wall 354 to define a recess 442 that can be open to the clutch sump 410 and located below the static fluid level 414. The first and second apertures 430, 434 can permit fluid communication between the second cavity 356 and the second reservoir 418. The first aperture 430 can be above the static fluid level 414 and open to the second cavity 356 and the second reservoir 418. The second aperture can be below the static fluid level 414 and can fluidly couple the second reservoir 418 and the recess 442.

The gate 422 can be coupled to the clutch housing 310 by the hinge 426. The hinge 426 can be located within the recess 442. The gate 422 can pivot about the hinge 426 between an open position (FIG. 3) and a closed position (FIG. 4). When in the open position, the gate 422 is spaced away from the second aperture 434 and fluid communication between the second reservoir 418 and the second cavity 356 is permitted through the second aperture 434. When in the closed position, the gate 422 covers the second aperture 434 to inhibit fluid communication between the second reservoir 418 and the second cavity 356 through the second aperture 434.

In operation, the first output shaft 218 and the third output shaft 222 can be coupled to rotate in the same rotational direction as the vehicle's wheel 42 (FIG. 1) to which each is drivingly coupled. When the first and second clutch plates 316, 318 are engaged to transmit torque between the second and third output shafts 220, 222, the outer clutch plate carrier 312 can rotate in the same rotational direction as the vehicle wheel 42 to which the third output shaft 222 is drivingly coupled. When the first and second clutch plates 316, 318 are engaged, the outer clutch plate carrier 312 can rotate in a first rotational direction 450 (FIG. 3). When the first and second clutch plates 316, 318 are disengaged, the differential gearset 252 causes the second output shaft 220, and thus the outer clutch plate carrier 312 to rotate in the opposite rotational direction as the vehicle wheel 42 to which the first and third output shafts 218, 222 are coupled. Thus, when the first and second clutch plates 316, 318 are disengaged, the outer clutch plate carrier 312 can rotate in a second rotational direction 452 (FIG. 4) that is opposite the first rotational direction 450.

When the outer clutch plate carrier 312 rotates in the first rotational direction 450 (FIG. 3), the outer clutch plate carrier 312 can act on the lubrication fluid in the clutch sump 410 to churn and pull the lubrication fluid in the first direction 450. Some of the lubrication fluid in the clutch sump 410 can cling to the outer clutch plate carrier 312 and can be slung from the outer clutch plate carrier 312 toward the inner wall 354 above the static fluid level 414. Some of the fluid slung onto the inner wall 354 can run down the inner wall 354 and through the first aperture 430, into the second reservoir 418. Some of the lubrication fluid can also be slung from the outer clutch plate carrier 312 directly through the first aperture 430 and into the second reservoir 418. The first aperture 430 can be located along the inner wall 354 such that when the outer clutch plate carrier 312 rotates in the first direction 450, fluid slung directly through the first aperture 430 is slung in a generally downward direction to impinge on fluid already collected in the second reservoir 418. As the lubricant fluid collects in the second reservoir 418 above the second aperture 434, the local pressure at the second aperture 434 acting on the gate 422 can increase due to the weight of the fluid and the additional fluid being slung into the second reservoir 418.

The churning of the lubrication fluid in the first direction 450 can also create an area of low pressure or suction in the recess 442, and draw fluid from the recess 442. The pressure differential between the second reservoir 418 at the second aperture 434 and the clutch sump 410 at the recess 442 can cause the gate 422 to move from the closed position to the open position and draw fluid from the second reservoir 418, through the second aperture 434 and back into the clutch sump 410. The flow of lubricant fluid through the second aperture 434 and into the clutch sump 410 can prevent the second reservoir 418 from becoming filled with lubricant fluid and can ensure adequate lubricant fluid remains in the clutch sump 410 while the clutch plates 316, 318 are engaged.

When the outer clutch plate carrier 312 rotates in the second rotational direction 452 (FIG. 4), the outer clutch plate carrier 312 can act on the lubrication fluid in the clutch sump 410 to churn and pull the fluid in the second direction 452. Some of the fluid in the clutch sump 410 can cling to the outer clutch plate carrier 312 and can be slung from the outer clutch plate carrier 312 toward the inner wall 354 above the static fluid level 414. Some of the fluid slung onto the inner wall 354 can run down the inner wall 354 and through the first aperture 430, into the second reservoir 418. Some of the fluid can also be slung from the outer clutch plate carrier 312 directly through the first aperture 430 and into the second reservoir 418. The first aperture 430 can be located such that when the outer clutch plate carrier 312 rotates in the second direction 452, the fluid slung through the first aperture 430 can be generally slung upwards through the first aperture 430 and into the second reservoir 418.

The churning of the lubrication fluid in the second direction 452 can also push fluid in the clutch sump 410 toward the recess 442 to create an area of higher pressure in the recess 442 and/or impinge on the gate 422. The pressure differential between the second reservoir 418 at the second aperture 434 and the clutch sump 410 at the recess 442 can cause the gate 422 to move from the opened position to the closed position to inhibit fluid from exiting the second reservoir 418 through the second aperture 434. The flow of lubricant fluid through the first aperture 430 and into the second reservoir 418, while the second aperture 434 remains closed, can cause the second reservoir 418 to become filled with lubricant fluid and reduce the amount of lubricant fluid that remains in the clutch sump 410 while the clutch plates 316, 318 are disengaged.

Thus, the gate 422 can be moved to the open position when the pressure differential is greater than a predetermined pressure differential and moved to the closed position when the pressure differential is less than the predetermined pressure differential. Thus, the gate 422, hinge 426, and second aperture 434 can act as a one-way valve with second aperture 434 acting as a valve body and the gate 422 operating as a valve member configured to open and close the valve body to permit flow of fluid from the second reservoir 418 to the clutch sump 410, while inhibiting flow from the clutch sump 410 to the second reservoir 418. It is understood that other types of one-way valves can be used. While not specifically shown, a biasing member such as a spring could be used to bias the gate 422 toward either of the open or closed positions such that the gate 422 is moved to the open or closed position when the pressure differential is greater than a predetermined pressure differential based on the biasing force of the biasing member. Thus, the fluid evacuation system 340 can be a means for controlling the volume of hydraulic fluid within the clutch sump 410.

Figure 5:
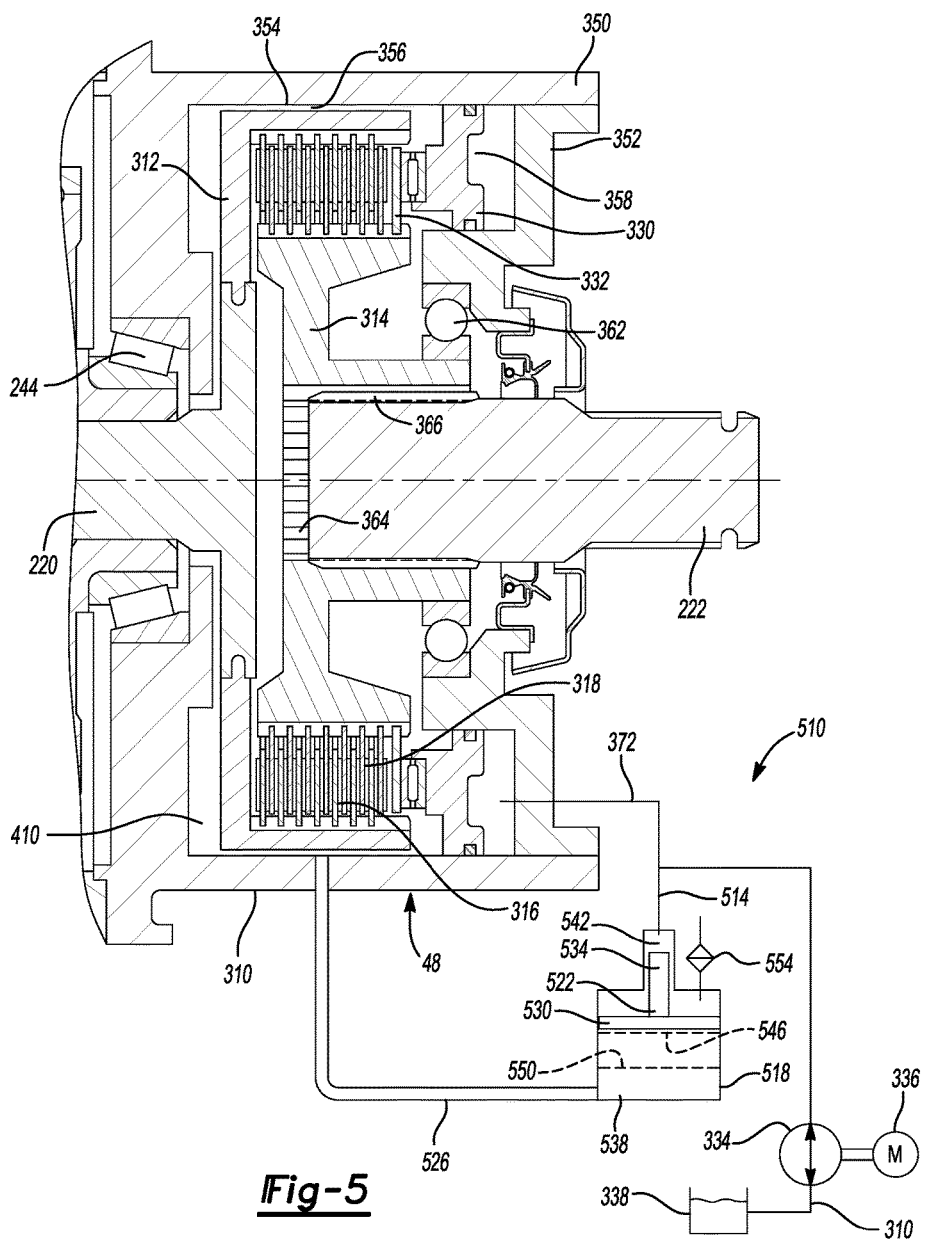
FIG. 5 is a sectional view of a portion of the clutch assembly of FIG. 2, schematically illustrating a fluid evacuation system of a second construction.

With reference to FIG. 5, a fluid evacuation system of a second construction is indicated by reference numeral 510. The fluid evacuation system 510 can be used with the second clutch 48 described in detail above. Those of skill in the art will appreciate that the fluid evacuation system 510 is applicable to other similar driveline components or clutches. The fluid evacuation system 510 can include a third pump conduit 514, a second piston chamber 518, a second piston 522, and a fluid level conduit 526. While schematically illustrated, the second piston chamber 518 can be wholly or partially defined by the housing 210 or the clutch housing 310, or can be a body separate from the housing 210 and clutch housing 310.

The second piston 522 can have a first piston side 530 and a second piston side 534. The first piston side 530 can be disposed within the second piston chamber 518 to partially define a variable volume fluid container or second reservoir 538 and the second piston side 534 can be disposed within the second piston chamber 518 to partially define an actuator chamber 542. The second reservoir 538 can be coupled for fluid communication with the clutch sump 410 by the fluid level conduit 526. The fluid level conduit 526 can be wholly or partially defined by the housing 210 or clutch housing 310, or can be separately coupled thereto. The actuator chamber 542 can be coupled for fluid communication with the pump 334 by the third pump conduit 514. The third pump conduit 514 can be wholly or partially defined by the housing 210 or clutch housing 310, or can be separately coupled thereto.

The second piston 522 can be movable within the second piston chamber 518 between a first position 546 and a second position 550. The first and second piston sides 530, 534 can be fixedly coupled for common translation. The volume of the second reservoir 538 can be larger when the second piston 522 is in the first position 546 than when it is in the second position 550. In the example provided, the second piston side 534 has a smaller diameter than the first piston side 530 and the second piston chamber 518 is vented by a vent 554 located between the first and second piston sides 530, 534 to prevent pressure buildup behind the first piston side 530 and permit the second piston 522 to move between the first and second positions 546, 550. The second piston side 534 can have a piston displacement that is significantly smaller than the piston displacement of the first piston side 530. The piston displacement of the second piston side 534 can also be significantly smaller than the piston displacement of the first piston 330. The second pump conduit 372 can be coupled for fluid communication with the third pump conduit 514.

In operation, when the pump 334 is operated in the first mode to pump the hydraulic fluid from the first reservoir 338 to the first piston chamber 358, some of the fluid can also be pumped through the third pump conduit 514 to the actuator chamber 542. Fluid pumped into the actuator chamber 542 exerts pressure on the second piston side 534 to move the second piston 522 from the first position 546 toward the second position 550. As the second piston 522 moves from the first position 546 to the second position 550, the volume of the second reservoir 538 decreases, causing lubricant fluid within the second reservoir 538 to flow from the second reservoir 538 into the clutch sump 410 through the fluid level conduit 526. Thus, when the pump 334 is operated in the first mode, the first and second clutch plates 316, 318 are moved into contact with one another to transmit torque and lubrication fluid is introduced into the clutch sump 410 to lubricate the first and second clutch plates 316, 318 while they are brought into contact.

When the pump 334 is operated in the second mode to pump the hydraulic fluid from the first piston chamber 358 to the first reservoir 338, the pump 334 also pumps hydraulic fluid from the actuator chamber 542 to the first reservoir 338. Removal of the hydraulic fluid from the actuator chamber 542 causes the second piston 522 to move from the second position 550 toward the first position 546. As the second piston 522 moves from the second position 550 to the first position 546, the volume of the second reservoir 538 increases, drawing lubricant fluid from the clutch sump 410 through the fluid level conduit 526 and into the second reservoir 538. Thus, when the pump 334 is operated in the second mode, the first and second clutch plates 316, 318 are moved apart from one another and lubricant fluid is removed from the clutch sump 410 to reduce drag caused by the rotation of the outer clutch plate carrier 312 and the first and second clutch plates 316, 318 through the lubricant fluid in the clutch sump 410. Thus, the fluid evacuation system 510 can be a means for controlling the volume of hydraulic fluid within the clutch sump 410.

With reference to FIGS. 6 and 7, a fluid evacuation system of a third construction is indicated by reference numeral 610. The fluid evacuation system 610 can be used with the second clutch 48 described in detail above. Those of skill in the art will appreciate that the fluid evacuation system 610 is applicable to other similar driveline components or clutches. The fluid evacuation system 610 can include a second piston chamber 614, second piston 618, a diaphragm 622, a third pump conduit 626, a stop member 630, and a vent conduit 634. The second piston chamber 614 can have a first portion 638 and a second portion 642. The first portion 638 can have a side wall 646 and a back wall 650. In the example provided, the first portion 638 is a recess defined by the clutch housing 310 and open to the bottom of the clutch sump 410. The second portion 642 can be formed in the back wall 650 of the first portion 638 and can be open to the first portion 638. The second portion 642 can be a diameter that is less than the diameter of the first portion 638.

The second piston 618 can have a first piston side 654 and a second piston side 658. The first piston side 654 can be disposed within the first portion 638. The second piston side 658 can be disposed within the second portion 642. The first and second piston sides 654, 658 can be fixedly coupled for common translation along an axis 660 between a first position 670 and a second position 672. The first piston side 654 can be a diameter that is less than the diameter of the side wall 646 of the first portion 638 and the diaphragm 622 can extend between the first piston side 654 and the side wall 646 to define a second reservoir 680. The diaphragm 622 can be fixedly coupled to the side wall 646 and the first piston side 654. The diaphragm 622 can be a flexible or resilient material to permit the first piston side 654 to move along the axis 660 between the first position 670 and the second position 672 to increase or decrease the volume of the second reservoir 680. The volume of the second reservoir 680 can be larger when the second piston 618 is in the first position 670 than when in the second position 672.

The vent conduit 634 can be coupled for fluid communication with the area of the first portion 638 that is separated from the second reservoir 680 by the first piston side 654 and the diaphragm 622. The vent conduit 634 can be open to the atmosphere or another area (not specifically shown) of the rear drive module 50 to prevent pressure buildup behind the first piston side 654 and permit the second piston 618 to move between the first and second positions 670, 672. The stop member 630 can be configured to limit the axial travel of the second piston 618. In the example provided, the stop member 630 is a strip or plate of rigid material mounted to the clutch housing 310 across the top of the first portion 638. The second piston 618 can move axially toward the outer clutch plate carrier 312 until contacting the stop member 630 at the second position 672. It is understood that the stop member 630 can be constructed in other ways to limit axial travel of the second piston 618.

The second piston side 658 and the second portion 642 can define an actuator chamber 684. The second piston side 658 can be a diameter that is smaller than the diameter of the first piston side 654 to have a smaller piston displacement than the first piston side 654. The piston displacement of the second piston side 658 can be significantly smaller than a piston displacement of the first piston 330. A seal, such as an o-ring 688 for example, can seal the second piston side 658 within the second portion 642. The third pump conduit 626 can fluidly couple the actuator chamber 684 with the pump 334 and the second pump conduit 372.

In operation, when the pump 334 is operated in the first mode to pump the hydraulic fluid from the first reservoir 338 to the first piston chamber 358 (FIG. 2), some of the hydraulic fluid can also be pumped through the third pump conduit 626 to the actuator chamber 684. Fluid pumped into the actuator chamber 684 exerts pressure on the second piston side 658 to move the second piston 618 from the first position 670 toward the second position 672. As the second piston 618 moves from the first position 670 to the second position 672, the volume of the second reservoir 680 decreases, causing lubricant fluid within the second reservoir 680 to flow from the second reservoir 680 into the clutch sump 410. Thus, when the pump 334 is operated in the first mode, the first and second clutch plates 316, 318 are moved into contact with one another to transmit torque and lubrication fluid is introduced into the clutch sump 410 to lubricate the first and second clutch plates 316, 318 while they are brought into contact.

When the pump 334 is operated in the second mode to pump the hydraulic fluid from the first piston chamber 358 to the first reservoir 338, the pump 334 also pumps hydraulic fluid from the actuator chamber 684 to the first reservoir 338. Removal of the hydraulic fluid from the actuator chamber 684 causes the second piston 618 to move from the second position 672 toward the first position 670. As the second piston 618 moves from the second position 672 to the first position 670, the volume of the second reservoir 680 increases, drawing lubricant fluid from the clutch sump 410 and into the second reservoir 680. Thus, when the pump 334 is operated in the second mode, the first and second clutch plates 316, 318 are moved apart from one another and lubricant fluid is removed from the clutch sump 410 to reduce drag caused by the rotation of the outer clutch plate carrier 312 and first and second clutch plates 316, 318 through the lubricant fluid in the clutch sump 410. Thus, the fluid evacuation system 610 can be a means for controlling the volume of hydraulic fluid within the clutch sump 410

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A clutched device comprising:
   an input member and an output member;
   a housing defining a clutch sump;
   a clutch assembly including a first piston chamber, a first piston, and a plurality of interleaved clutch plates, the first piston being configured to move between a first position and a second position, the clutch plates being configured to rotate through the clutch sump and to transmit torque between the input member and the output member when the first piston is in the second position;
   a first reservoir configured to hold a hydraulic fluid;
   an evacuation device including a second piston chamber and a second piston disposed within the second piston chamber and configured to move between a third position and a fourth position, the second piston having a first side and a second side, the first side of the second piston and the second piston chamber defining a second reservoir, the second reservoir being in fluid communication with the clutch sump and having a first volume when the second piston is in the third position and a second volume that is greater than the first volume when the second piston is in the fourth position, and the second side of the second piston and the second piston chamber defining an actuator chamber that is coupled for fluid communication with the first piston chamber; and
   a pump operable in a first mode wherein the pump is configured to pump the hydraulic fluid from the first reservoir to the first piston chamber and the actuator chamber, and a second mode wherein the pump is configured to pump the hydraulic fluid from the first piston chamber and the actuator chamber to the first reservoir.

2. The clutched device of claim 1, further comprising a fluid conduit, the fluid conduit coupling the second reservoir and the clutch sump for fluid communication between the second reservoir and the clutch sump.

3. The clutched device of claim 1, wherein the first side of the second piston has a greater piston displacement than the second side of the second piston.

4. The clutched device of claim 1, wherein the second piston is configured to move between the third and fourth positions along an axis that is transverse to an axis of rotation of the clutch plates.

5. The clutched device of claim 4, wherein the evacuation device includes a stop member, the stop member configured to limit axial travel of the second piston in a direction toward the clutch plates.

6. The clutched device of claim 1, wherein the first side of the second piston has a diameter that is less than a diameter of the second reservoir.

7. The clutched device of claim 6, wherein the evacuation device includes a diaphragm, the diaphragm being fixedly coupled to a surrounding wall of the second reservoir and the first side of the second piston to partially define the second reservoir.

8. A clutched device comprising:
   an input member and an output member;
   a housing defining a clutch sump;
   a lubricant fluid disposed within the clutch sump;
   a clutch assembly including a first piston chamber, a first piston, and a plurality of interleaved clutch plates, the first piston being configured to move between a first piston position and a second piston position, the clutch plates being configured to rotate through the clutch sump and to transmit torque between the input member and the output member when the first piston is in the second piston position; and
   a means for controlling a level of a lubricant fluid in the clutch sump;
   wherein the means for controlling the level of the lubricant fluid in the clutch sump comprises a variable volume fluid container in fluid communication with the clutch sump;
   wherein the means for controlling the level of the lubricant fluid in the clutch sump further comprises a second piston and a second piston chamber, the variable volume fluid container being partially defined by a first side of the second piston, a second side of the second piston partially defining the second piston chamber, the second piston chamber being coupled for fluid communication with the first piston chamber; and
   wherein the first side of the second piston has a greater piston displacement than the second side of the second piston.

9. A clutched device comprising:
   an input member and an output member;
   a housing defining a clutch sump;
   a lubricant fluid disposed within the clutch sump;
   a clutch assembly including a first piston chamber, a first piston, and a plurality of interleaved clutch plates, the first piston being configured to move between a first piston position and a second piston position, the clutch plates being configured to rotate through the clutch sump and to transmit torque between the input member and the output member when the first piston is in the second piston position; and
   a means for controlling a level of a lubricant fluid in the clutch sump;

wherein the means for controlling the level of the lubricant fluid in the clutch sump comprises a variable volume fluid container in fluid communication with the clutch sump;

wherein the means for controlling the level of the lubricant fluid in the clutch sump further comprises a second piston and a second piston chamber, the variable volume fluid container being partially defined by a first side of the second piston, a second side of the second piston partially defining the second piston chamber, the second piston chamber being coupled for fluid communication with the first piston chamber; and wherein the means for controlling the level of the lubricant fluid in the clutch sump further comprises a diaphragm, the variable volume fluid container being partially defined by the diaphragm, the diaphragm being fixedly coupled to the first side of the second piston.

* * * * *